(12) United States Patent
Dean et al.

(10) Patent No.: US 6,317,840 B1
(45) Date of Patent: Nov. 13, 2001

(54) CONTROL OF MULTIPLE EQUIVALENT FUNCTIONAL UNITS FOR POWER REDUCTION

(75) Inventors: Alvar A. Dean; Kenneth J. Goodnow; Patrick E. Perry, all of Essex Junction; Sebastian T. Ventrone, South Burlington, all of VT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/275,170

(22) Filed: Mar. 24, 1999

(51) Int. Cl.[7] ................................ G06F 1/32; G06F 1/04
(52) U.S. Cl. ......................... 713/320; 713/500; 713/300
(58) Field of Search .................................. 713/300, 310, 713/320, 322, 500; 710/58

(56) References Cited

U.S. PATENT DOCUMENTS

| | | |
|---|---|---|
| 3,700,931 * | 10/1972 | Watkins et al. ..................... 327/160 |
| 4,238,833 * | 12/1980 | Ghest et al. ......................... 708/628 |
| 5,128,890 | 7/1992 | Girardeau, Jr. . |
| 5,426,755 | 6/1995 | Yokouchi et al. . |
| 5,469,427 | 11/1995 | Sato . |
| 5,493,683 | 2/1996 | Cloud et al. . |
| 5,694,349 * | 12/1997 | Pal ....................................... 708/622 |
| 5,774,701 * | 6/1998 | Matsui et al. ....................... 713/501 |

FOREIGN PATENT DOCUMENTS

410094019-A * 4/1998 (JP) ................................. H04Q/7/18

* cited by examiner

*Primary Examiner*—Xuan M. Thai
(74) *Attorney, Agent, or Firm*—Schmeiser, Olsen & Watts; Mark F. Chadurjian

(57) ABSTRACT

A processor with multiple equivalent functional units for power reduction, which includes a mechanism for controlling the selection of functional units. Specifically, the processor comprises a first circuit performing a predetermined function at a first speed, a second circuit for performing the same predetermined function at a second speed, and a control system for selecting either the first or second circuit to perform the function. The control system further includes a mechanism for controlling the rate of execution of the processor instructions in the pipeline in order to compensate for the speed at which the first or second circuit was performing the predetermined function.

16 Claims, 3 Drawing Sheets

CONTROL OF MULTIPLE EQUIVALENT FUNCTIONAL UNITS FOR POWER REDUCTION

TECHNICAL FIELD

The present invention generally relates to the field of integrated circuits, and more specifically relates to an integrated circuit, such as a microprocessor, which may include multiple equivalent functional units for power reduction purposes.

BACKGROUND OF THE INVENTION

There is increasingly a requirement in the design of modern integrated circuits to reduce power consumption such that applications that utilize battery power can operate for longer periods of time. For example, cellular phones, personal digital assistance, and lap tops, are all examples of battery-based systems that utilize integrated circuits. A primary consumer of power in such systems is the microprocessor, which is designed to deliver as much speed and performance as possible. Unfortunately, as a general rule, the speed of the microprocessor is proportional to the rate of power consumption. Thus, many systems include mechanisms to slow down the clock speed in the microprocessor to reduce power consumption during periods when high performance is not required. Other similar mechanisms place the microprocessor in a "sleep mode" that utilize low power, but must be woken up before operations can continue.

It is recognized in such systems that there arise occasions when the microprocessor must keep performing its operations, but not necessarily at the same speed (and therefore power rate) that is required during periods of peak performance. Thus, a mode of operation somewhere between "sleep mode" and normal high speed operations would adequately meet the system's requirements. For example, a personal digital assistant may not need to be operating at its full capacity until an input from the keyboard or screen is accepted. As noted, the current method of achieving such a reduction in central processing unit (CPU) power is by reducing the clock to the processor units. Complementary metal oxide semiconductor (CMOS) designs have a linear relationship between speed and power. Accordingly, reductions in the clock rate also reduce power consumption. However, the slowing down of the clock rate to most critical functional units (e.g., a multiplier circuit) does not reduce the total amount of energy required to complete an operation, it merely extends the period over which the energy is consumed. Thus, the same amount of energy will be used, just over a longer period of time. Therefore, slowing down the clock rate does not necessarily guarantee a reduction in the total power consumption required by the microprocessor.

It is recognized that power consumption is directly related to the amount of toggling of wires or nets within a circuit. Each time a wire toggles between a low and high voltage level, a certain amount of power is consumed. In most high speed functional circuits, the design emphasis is placed on speed, rather than power consumption. To achieve high speed functional circuits, numerous parallel operations need to be implemented simultaneously. Thus, any time a high speed functional operation is performed, a high number of toggles occur within a very short time period, consuming a tremendous amount of power. Moreover, because such operations utilize numerous parallel processes that require different amounts of time to complete their individual calculation, the output node of a parallel processing operation may toggle numerous times before a final result (i.e., a steady state) is reached. An example of this is depicted in FIG. 3, where an output signal 56 of a fast multiply circuit is depicted. It can be seen at reference numeral 60 that the output signal 56 toggles numerous times before reaching a steady state. From a functional standpoint, the toggling does not represent a problem so long as the steady state is reached before the end of the clock cycle 62. Unfortunately, the unnecessary toggling 60 characterized in most high speed circuits consumes power and therefore drains the systems battery.

Accordingly, a solution for power reduction is needed even after the clock has been slowed to its lowest frequency. Without a processor that can deliver low power performance, battery powered applications cannot be fully exploited.

SUMMARY OF THE INVENTION

The invention provides a system for decreasing the power consumption of a microprocessor while maintaining its performance. The invention provides that for any given function in a processor, a second equivalent function can be implemented. In order to reduce power consumption, the second equivalent function may be implemented with a slower, less energy consuming circuit. Accordingly, the microprocessor is designed such that the second equivalent function is afforded more time to complete the same operation, or is designed to use a lower speed option available within the processor to minimize the number of additional cycles required. Accordingly, the invention comprises a processing system that comprises a first circuit for performing a function at a first, normal speed; a second circuit for performing the same function at a second, slower speed; and a control system for selecting either the first or second circuit to perform the function.

The processing system further comprises a mechanism for controlling the rate of execution of processor instructions. Specifically, because the amount of time to complete a function depends on which circuit the control system selects, the execution of subsequent processor instructions in the processor's pipeline may need to wait until the function is complete. Controlling the rate of execution may be accomplished by varying the clock speed to the pipeline, or by having the pipeline check with the control mechanism to determine if the function is complete. Finally, the decision to selecting either the normal speed circuit, or the functionally equivalent slower speed circuit can be controlled by either an opcode in the instruction stream, or by an external signal.

BRIEF DESCRIPTION OF THE DRAWINGS

The present invention is illustrated by way of example in the the accompanying drawings in which like references indicate like elements and in which.

DETAILED DESCRIPTION OF THE PREFERRED EMBODIMENTS

Figure 1:
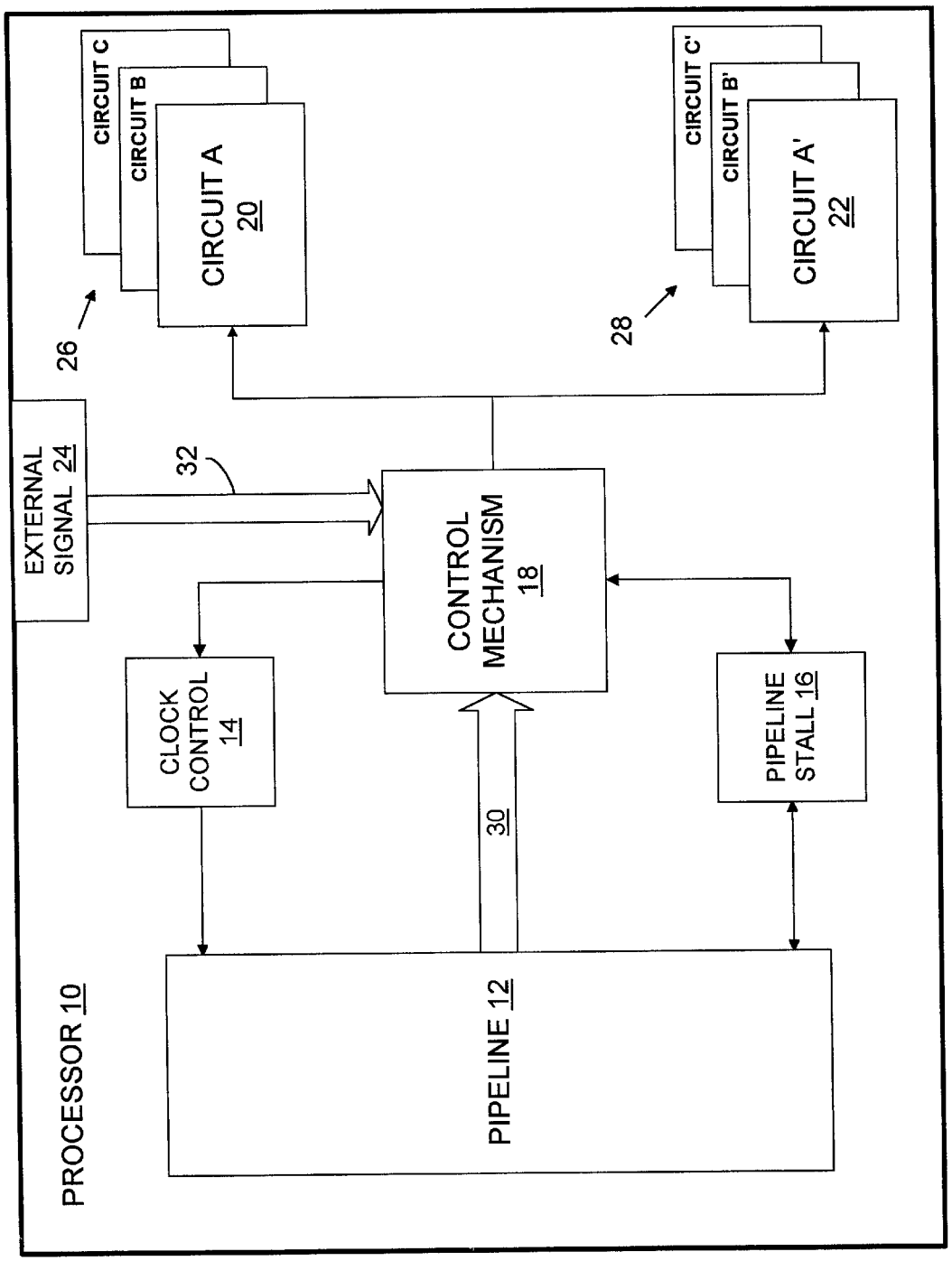
FIG. 1 depicts a processor with functionally equivalent circuits in accordance with a preferred embodiment of the present invention.

Referring now to the figures, FIG. 1 depicts a processor 10 that comprises various equivalent functions 26 and 28. Each function represents a hardware implementation for a particular operation where any function that can be implemented with combinatorial logic may be included. For each one of the functions 26 that implement some process, an equivalent function 28 is also included. For example, CIRCUIT A 20 has a functionally equivalent counterpart CIRCUIT A' 22. Thus, whatever logical function CIRCUIT A performs (e.g., a multiplication), CIRCUIT A' 22 is capable of performing the same logical function. The distinction between CIRCUIT A 20 and CIRCUIT A' 22 is that CIRCUIT A' 22 comprises a circuit design that is operationally slower and therefore requires less energy. Similarly, CIRCUIT B has a functionally equivalent counterpart, CIRCUIT B' and CIRCUIT C has a functionally equivalent counterpart CIRCUIT C'.

Accordingly, although a given circuit and its counterpart are functionally equivalent (e.g., A and A' both perform a multiplication operation), they utilize a different internal logic structure to achieve the same result. For example, the faster version of a given function may be implemented with numerous parallel operations that operate on data simultaneously. Alternatively, the slower version of the same function may be implemented in a more sequential fashion, with fewer parallel operations. Thus, while the two circuits perform the same function from an external viewpoint, they may each be implemented with their own unique arrangement of internal logic.

Processor 10 further includes a control mechanism 18 for selecting an appropriate circuit under the circumstances. For example, control mechanism 18 may determine that a high speed multiplication is required, and therefore direct CIRCUIT A 20 to perform the operation. Alternatively, control mechanism 18 may recognize that a multiplication operation is required, however, the speed at which it is performed is not critical. In this case, control mechanism 18 would choose CIRCUIT A' 22. Control mechanism 18 may be directed to utilize either a normal circuit or its low power equivalent circuit either by an external signal 24 delivered over signal path 32, or from an instruction in the pipeline 12 delivered over signal path 30. It is further understood that any other system, such as software, an external signal, a battery monitoring device, etc. may be utilized for influencing the control mechanism to select the high or low powered circuits.

Pursuant to traditional processor operations, processor instructions are loaded into pipeline 12 and subsequently dispatched for execution. Each instruction may require the processor to implement a functional circuit, at which time a decision can be made by the control mechanism 18 to choose either a normal, high power 26 or low power 28 option. In the event that the control mechanism 18 chooses a low power circuit 28, the rate of execution of the subsequent instructions in the pipeline must be altered to ensure that the low power circuit completes its operation. FIG. 1 depicts two possible methods for controlling the rate of execution of instructions in the pipeline to achieve such an alteration. The first method incorporates a clock control mechanism 14 that slows down the clock speed of the pipeline 12. By slowing down the clock speed of the pipeline 12, the slower speed function will have time to complete its operation before or within the specified number of clock cycles associated with that function. In order to achieve this, the control mechanism 18 may have to analyze the amount of time required to perform the low speed function and subsequently make the necessary adjustments to the clock signal controlling the pipeline 12. This may be accomplished with a look-up table that determines the amount of time adjustment required for each function.

A second method for controlling the execution rate of the instructions in pipeline 12 would be to utilize a pipeline stall mechanism 16 that would essentially delay the further dispatching of instructions until the slower speed circuit completed its task. This implementation may require that the pipeline stall mechanism 16 communicate with the control mechanism 18 until the slower speed function is complete. This could be accomplished by having the pipeline stall mechanism 16 assert a wait signal to the control mechanism 18 until the results are correct. Once complete, the pipeline stall mechanism 16 would restart the pipeline and continue with normal processing. In this implementation, the current speed of the processor may be used to dictate how much stall time would be required to be added to the pipeline while the slower speed circuit is being used. This could be accomplished with an algorithm that examines both the time necessary to complete the function and the speed at which the clock is running. For instance, if the clock period was 10 nanoseconds, and the function takes 15 nanoseconds to complete, a stall time of 20 nanoseconds would guarantee the necessary result.

An additional method for controlling the pipeline 12 would be to utilize instructions within the software being executed by the processor 10 to delay further operations. To implement this control, a compiler could be used to generate separate "slow function routines" with the appropriate software opcodes and padding (e.g., stalls or no-op instructions). This approach may further require that the compiler generate instructions that completely control the clock speed in order to ensure proper operation. The invention could also be implemented on a super-scalar architecture processor, which comprise multiple execution units, each capable of performing the same function. Thus, both slow, less costly execution units and fast, more costly execution units could be utilized. In such an implementation, the processor could dispatch operations to the low power functions and then compensate for the increased time by dispatching other unrelated operations, or by not dispatching any new opcodes.

Figure 2:
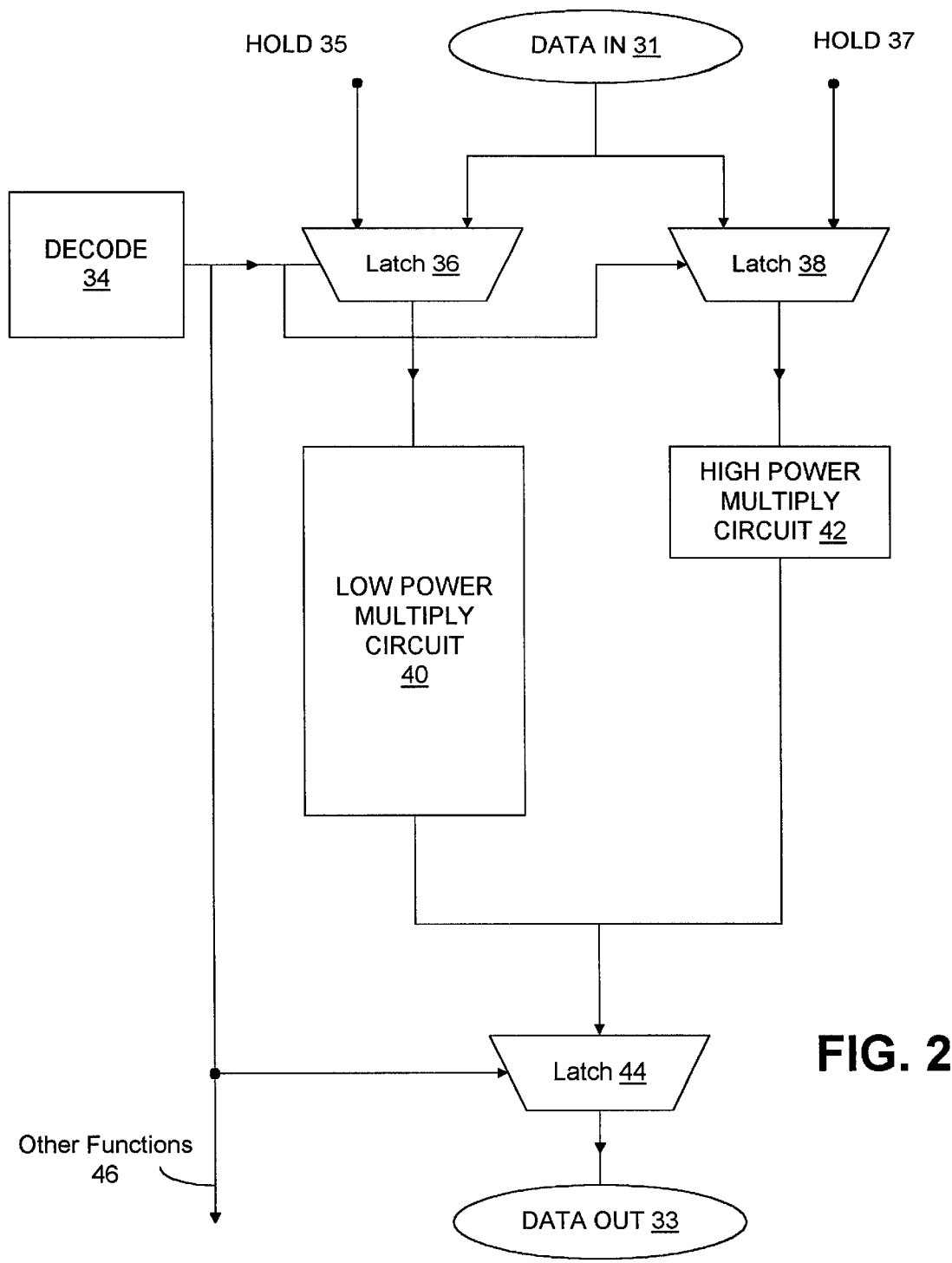
FIG. 2 depicts an example of an implementation of two functionally equivalent circuits in accordance with a preferred embodiment of the present invention.

Referring now to FIG. 2, a specific implementation of a low power multiply circuit 40 and a high power multiply circuit 42 is depicted. Pursuant to this example, a DATA IN signal 31 is fed into two separate latches, latch 36 and latch 38. When the multiply function is required, a decode mechanism 34 provides an appropriate signal that causes DATA IN 31 to be latched into the appropriate circuit via either latch 36 or latch 38. Control over which circuit to use may be achieved with hold signals 35 and 37, which will act to enable the appropriate circuit. In this example, if the high speed, high power multiply circuit 42 is required, latch 38 would be enabled. Alternatively, if a low power, low speed, multiply circuit 40 is acceptable, latch 36 would be enabled. Once the respective circuit has completed its operation, the resultant data would be latched out through latch 44 as DATA OUT signal 33. Additional functions 46, such as adders, comparators, decoders, look-up tables, etc., could be implemented in a similar manner.

Figure 3:
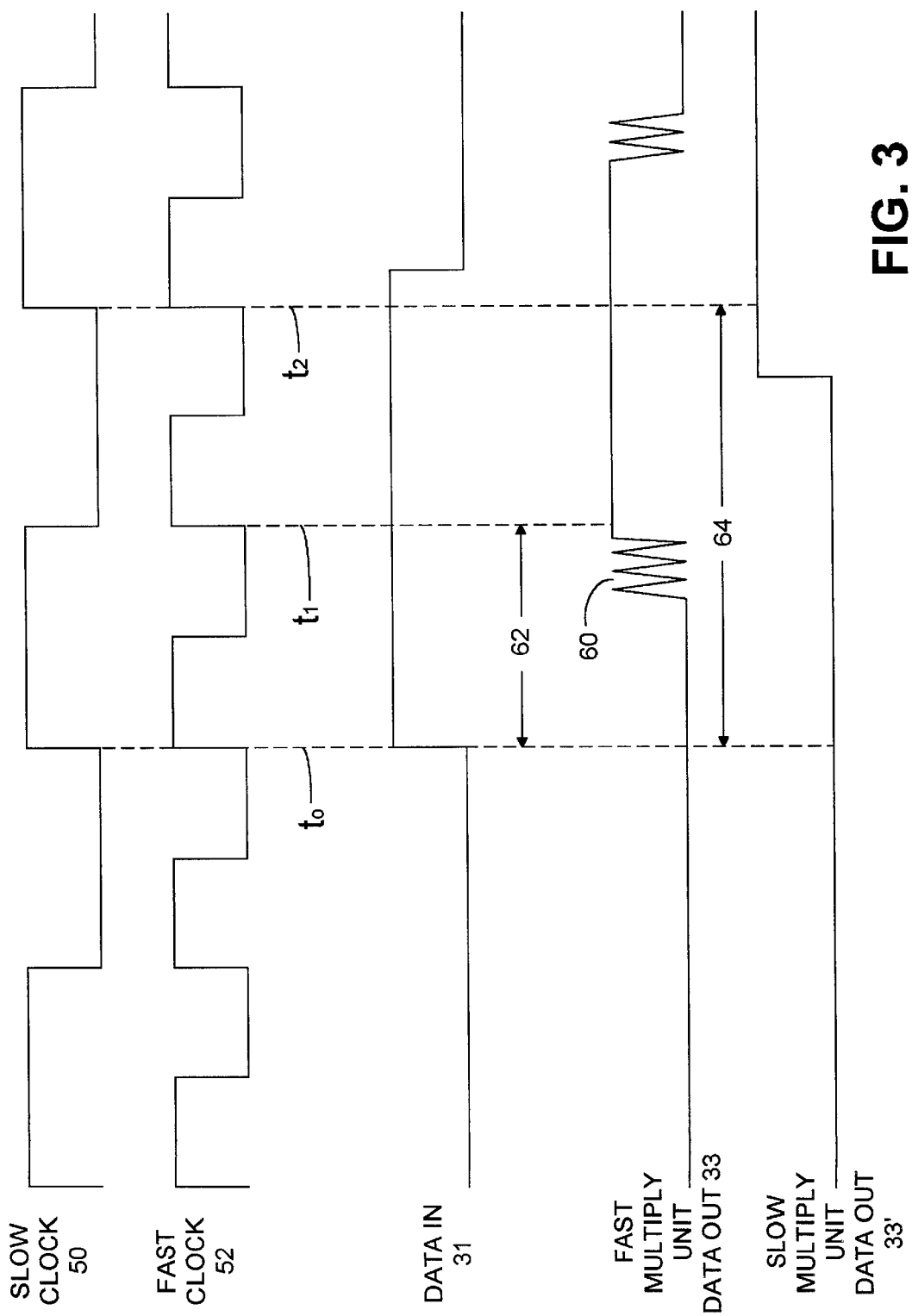
FIG. 3 depicts a timing diagram that details how the preferred embodiment can be implemented with varying clock control to the pipeline.

Referring now to FIG. 3, a timing diagram is depicted showing how the a fast multiply circuit and slow multiply circuit would be affected in the case where the clock signal to the pipeline 12 is varied to accommodate for the slower multiply circuit. In the case where the fast multiply circuit is operational, a fast clock signal 52 would be used to drive the operation. In such a case, DATA IN signal 31 would be latched into the high speed circuit at time $t_0$. The fast multiply circuit would then calculate its result quickly and be required to provide an output signal DATA OUT 33, by the end of the respective clock cycle 62 at time $t_1$.

Alternatively, in order to implement the slow multiply circuit, a slow clock signal 50 would be used and the DATA IN signal 31 would be latched into the system at the same time to as with the fast multiply clock signal 52. In this case, however, the slow multiply circuit is afforded a larger clock cycle 64 ending at time t₂ to make its calculation and generate an output signal, DATA OUT 33'. Therefore, by varying the clock signal to the pipeline, the slow function is afforded more time implement its function without seriously disrupting the operation of the pipeline.

As previously noted, it is also possible to implement a system wherein the fast clock signal 52 is maintained, but the slower function is given additional clock cycles to complete its computation. In the case depicted in FIG. 3, the slow multiply unit would be given two clock cycles (t₀–t₂) to output the DATA OUT signal 33'. Any means for implementing such a stalling mechanism is contemplated as part of this invention. For example, as described above, the pipeline may include a system of checking to see if the slow function is complete before dispatching the next instruction. This could be accomplished, for example, with a delay chain that mirrors the worst case operational time of the given function. In such a case, the delay chain could output a "1" when a signal propagated to the end thereby providing a worst case timing scenario for the given function. Alternatively, the number of clock cycles required for each slow function could be hardwired into the system, so that each slow function would be given a predetermined amount of time to complete its processing.

The foregoing descriptions of the preferred embodiments in the invention have been presented for purposes of illustration and description. They are not intended to be exhaustive or to limit the invention to the precise form disclosed, and obviously many modifications and variations are possible in view of the above teachings. Such modifications and variations that may be apparent to a person skilled in the art are intended to be included within the scope of this invention as defined by the accompanying claims.

We claim:

1. A processing system comprising:

processing means;

a plurality of circuits each separately capable of executing a function received from the processing means, each operating at a different processing speed, and each requiring a different amount of energy for executing the function; and wherein the processing means selects only one of said plurality of circuits for executing the function.

2. The processing system of claim 1, further comprising a pipeline, wherein the pipeline is operated at a speed that is dependent upon the processing speed of the selected circuit.

3. The processing system of claim 1, further comprising a pipeline and means for stalling the pipeline until the selected circuit completes execution of the function.

4. The processing system of claim 1, wherein the selection of one of the plurality of circuits is determined by an opcode loaded into the processing means.

5. The processing system of claim 1, wherein the selection of one of the plurality of circuits is determined by an external signal inputted into the processing system.

6. A microprocessor, comprising:

a first circuit for performing a function at a first speed;

a second circuit for performing the function at a second speed; and a control system for selecting either the first or second circuit to perform the function.

7. The microprocessor of claim 6, further comprising:

a pipeline for holding processor instructions; and a mechanism for controlling a rate of execution of the processor instructions, wherein the rate of execution of the processor instructions is dependent upon which of the first or second circuits were selected by the control system.

8. The microprocessor of claim 7, wherein the mechanism for controlling the rate of execution of the processor instructions comprises a mechanism for altering a clock speed of the pipeline.

9. The microprocessor of claim 7, wherein the mechanism for controlling the rate of execution of the processor instructions comprises a mechanism for stalling pipeline operations until performance of the function is complete.

10. The microprocessor of claim 6, wherein the first circuit is a default circuit that performs the function at a normal high speed, and the second circuit is a low power circuit that performs the function at a slower speed and requires less power.

11. The microprocessor of claim 10, wherein the control system causes the second circuit to be used to perform the function when a predetermined opcode is detected.

12. The microprocessor of claim 10, wherein the control system causes the second circuit to be used to perform the function when an external signal is detected.

13. A processing system, comprising:

pipeline means for holding and dispatching processor instructions;

first circuit means for performing a predetermined function using a first amount of energy;

second circuit means for performing the predetermined function using a second amount of energy, wherein the second amount of energy is less than the first amount; and control means for selecting either the first or second circuit means to perform the predetermined function when a predetermined processor instruction is dispatched from the pipeline means.

14. The processing system of claim 13, further comprising means for altering a processing rate of the pipeline means, wherein the means for altering the processing rate is dependent upon the circuit selected by the control means.

15. The processing system of claim 14, wherein the means for altering the processing rate comprises means for altering a clock rate driving the pipeline means.

16. The processing system of claim 14, wherein the means for altering the processing rate comprises means for stalling the pipeline means until the predetermined function is completely performed.

* * * * *